United States Patent Office 3,275,515
Patented Sept. 27, 1966

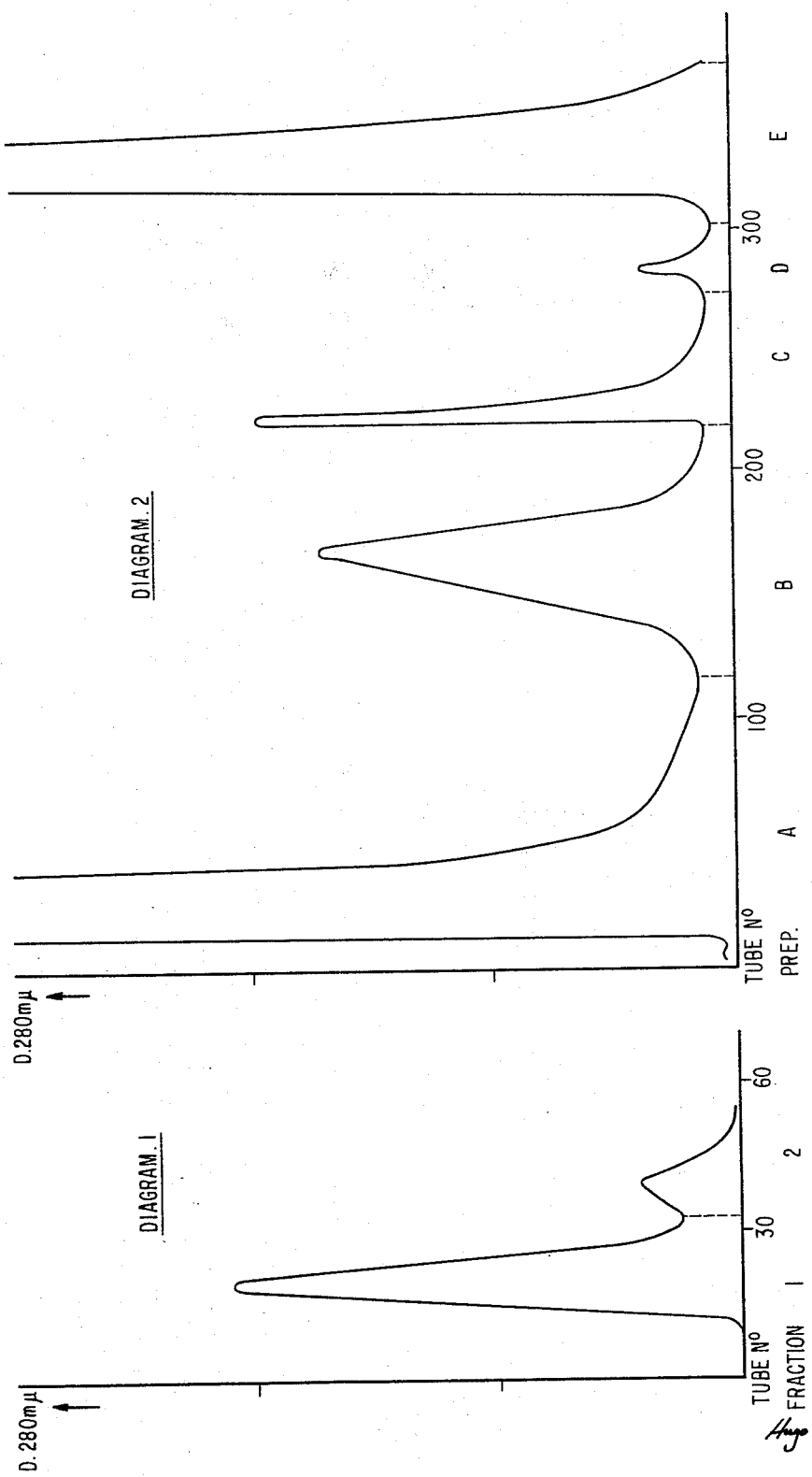

3,275,515
PURIFICATION OF FAT MOBILIZING SUBSTANCES
Jan Willem de Vries, Oss, Netherlands, assignor to Organon Inc., West Orange, N.J., a corporation of New Jersey
Filed Sept. 3, 1963, Ser. No. 306,130
Claims priority, application Netherlands, Sept. 21, 1962, 283,518
2 Claims. (Cl. 167—74)

The invention relates to the preparation of injectable pituitary extract fractions having fat mobilizing activity substantially free from pressor activity.

It has been known for a considerable time past that crude pituitary extracts are capable of raising the quantity of fatty acids in the blood after injection into animals sensitive to it. On continuation of the treatment with such extracts the fat deposits in the body are mobilized while hydrolising the fats, causing a strong rise of the level of the free fatty acids in the blood and an increased amount of liver-fat (D. Rudman and F. Seidman, Proc. Soc. Exper. Biol. 99, 146 (1958)).

This effect was supposed for a long time to be due to known pituitary hormones, such as thyreotrophic hormone, prolactin, growth hormone and corticotrophic hormone (ACTH). It has indeed been found that the said action occurs to a greater or less degree after administration of preparations containing these hormones.

Furthermore it has been found that even very pure ACTH preparations still have this fat mobilizing property. But a pituitary extract will retain its fat mobilizing properties after removal of the ACTH, which cannot be accounted for by the amounts of the said hormones still present in it.

The use of a thus treated extract on account of its fat mobilizing property has the drawback, however, that most undesirable side effects occur, for it proves to have a pressor action manifest for example in a strong constriction of the ear veins of a rabbit after injection of these preparations.

Also in the purification of these extracts by methods described in the literature (Friesen, Barret and Astwood, Endocrinology 70, 579 (1962) and Proceedings National Academy of Sciences 47, 1525 (1961)) preparations are obtained still possessing this pressor action.

The manufacture of purified preparations without this undesirable side effect is the subject of this invention. By the present process fat mobilizing substances can be prepared free from the described side effect.

A process has been found for the preparation of fat mobilizing substances substantially free from pressor activity from pituitary extract fractions which comprises preparing a crude pituitary concentrate, chromatographically purifying said concentrate by filtering a solution thereof through a bed of a cross-linked polysaccharide containing diethylaminoethyl groups, and recovering the active fractions by elution.

This chromatography is performed by means of a cross-linked polysaccharide gel in which, by chemical treatment, diethylaminoethyl groups have been introduced. Said material is known as DEAE Sephadex and manufactured in several types with different size of pores. They are used as ion exchanging substances for biological material. Reference is made to Flodin "Dextran Gels and Their Applications in Gel Filtration," Uppsala 1962, e.g. page 25 under "Ethers."

To obtain optimal results in the chromatographic purification it is to be preferred to start from a concentrate from which salts and other low molecular substances have been removed, which may be done for example by submitting the crude extract to a dialysis or other fractionation. By preference an aqueous solution of the crude concentrate is first submitted to filtration through a gel with the action of a molecular sieve. Said gels are cross-linked dextranes and known as Sephadex. They act as a molecular sieve and are available in several types, differing in the size of their pores. (See Flodin, idem, e.g. pages 14–24 and 42.) Unlike the DEAE Sephadex types they cannot be used for ion exchanging purposes. Further it has been found that the chromatographic purification at a pH ≤5 is preferred.

For the preparation of the crude concentrates pituitary anterior lobes are taken as starting material. They may be treated by the methods of Best and Campbell, described in J. Physiol. 86, 190 (1936), stating the extraction of pituitary glands both in alkaline and acid medium, followed by removal of the inactive precipitates at pH 5.2. In the remaining liquid the active substances can be precipitated crude with two volumes of ethanol. It is also possible first to separate the ACTH from the pituitary extract by any method known per se, as described in for instance U.S. Patent 2,985,560. After removal of the ACTH the fat mobilizing factors may be concentrated from the solution by the principles of Best and Campbell.

The resulting crude concentrate, which is preferably submitted to lyophilisation, has favourable fat mobilising properties. This may be shown by dissolving for example 1 mg. of the dry preparation in a little dilute acetic acid and injecting this solution into a rabbit of about 3 kg., whereupon a very strong increase of nonesterified fatty acids in the blood is noticeable. Two hours after injection the blood level is about ten times higher than before the injection. But such a preparation is unfit for therapeutic use, as apart from salts it also contains substances raising the blood pressure. The pressor activity of such a preparation amounts to 0.1–0.2 U/mg. determined as vasopressin in the rat (see U.S.P. XVI, 793). This pressor content hampers its use in view of the relatively high dosages that have to be administered to obtain a reasonable therapeutic effect.

The preferred preceding purification step is a so-called gel filtration by means of a substance having the properties of a molecular sieve in the form of a column, as for instance Sephadex G75, a polysaccharide derivative, by which the active and further inactive fractions are separated. The latter also contain salts which might be a disturbing factor in the chromatographic purification.

The starting product, which is usually available in the form of a dried or lyophilised preparation, is dissolved before the gel filtration in a buffer of a pH of about 5.

To be preferred is the use of a buffer of a pH ≤5, because it has been found that application of a buffer of higher pH causes losses in the chromatographic purification. When a preparation in solution is taken as starting material the buffer is added to that and the solution adjusted at a pH of about 5. The following buffer systems can be used, e.g. sodium-acetate-acetic acid, ammonium acetate-acetic acid, pyridine-acetic acid, trimethylamine-acetic acid, triethylamine-acetic acid. For preference a volatile buffer is applied with an ionic strength below 0.1, for example pyridine-acetic acid ≤0.05 molar.

A volatile buffer has the advantage that it can be readily removed by the concentration of the active fraction for the following treatment. The resulting solution in a buffer is first centrifuged to remove any turbidities and then subjected to the gel filtration described. The filter material has previously been equilibrated with the same buffer system in which the active substance has been dissolved.

The elution of the fractions may be followed by, for example, determination of the extinction of the filtrate t 280 mμ. The resulting active first fraction is evapoated to a small volume at low temperature and pressure, mounting to say 20% of the original volume.

Next the distillation residue is subjected to chromatographic purification on DEAE Sephadex, in the form of column equilibrated with the same buffer system as used in the previous filtration.

In the first instance the elution of this column is performed with this buffer system. In the eluate there appears a substance absorbing at 280 mμ corresponding to the first peak in the chromatogram which after lyophilisation yields a preparation with fat mobilizing properties, but also a strong pressor activity corresponding with that of 0.4 U/mg. determined as vasopressin.

On continuation of the elution with the same buffer there appears a substance in the eluate yielding a second peak in the chromatogram. After lyophilisation a preparation is obtained with favourable fat mobilizing properties, but without pressor activity, at least an activity very much lower per milligram than that corresponding with 0.01 U of vasopressin.

The elution of further adsorbed fractions is preferably performed with a solution of a volatile acid of a pH ≤5, for example 0.05 M acetic acid, first eluting substances without fat mobilizing activity, causing two extinction peaks in the chromatogram. Finally a fraction is collected which after lyophilization yields a preparation without appreciable pressor activity (much lower than 0.01 U/mg.), but with favourable fat mobilizing properties.

These properties cannot be caused by the content of ACTH as it is very low in the preparations subjected to chromatography.

It is also possible to use other acid concentrations in the chromatography for example higher concentrations, eluating the various fractions more quickly, in which they can partly overlap each other. This need by no means be an objection, if only the first fraction containing the pressor activity is separated from the rest of the fractions. It is also possible to bring about the elution more quickly, but with a lower degree of separation, by reducing the initial pH of the column, for example by equilibrating it with a buffer of lower pH.

*Example I*

Hog anterior pituitary powder (306 gm.), obtained by dehydration of the anterior lobes with acetone, followed by grinding, was extracted for two hours with 20 volumes of 0.05 N NaOH. The extraction residue was removed by centrifugation and extracted again with 10 volumes of 0.05 N NaOH. The collected centrifugates were adjusted at pH 5.2 by the addition of 4 N HCl and the precipitate formed removed by centrifugation.

To the remaining solution 2 volumes of ethanol were added at 0° C. The precipitate formed was collected and dried in vacuo. After drying the weight amounted to 4.80 gm.

The product obtained was further purified by gel filtration.

Sephadex G 75 (120 gm.) was stirred with a 0.01 M prdidine-acetate buffer of pH 5.0. Of the swollen gel an annular column was formed of an outer diameter of 9 cm., an inner diameter of 4 cm. and a height of 27 cm. The column was carefully equilibrated with the said buffer. Of the product to be purified 2.4 gm. were dissolved in 20 ml. of 0.01 M pyridine-acetate buffer of pH 5.0. A slight turbidity was removed by centrifugation. The clear centrifugate was placed on the column and eluted with the buffer mentioned before.

There appear two substances in the eluate with absorption peaks at 280 mμ, measured by differential spectophotometry (see Diagram 1). The eluate belonging to the first peak was collected and evaporated in vacuo at low temperature to 15% of the initial volume. Immediately after the substance causing the last peak had left the column a fresh quantity of the product the be purified (2.4 gm.) was placed on the column and treated as described. A total quantity of 190 ml. of concentrate was obtained from 4.8 gm. of starting product. This crude concentrate was further purified according to the invented method.

DEAE Sephadex-A 25 (62 gm.), an anion exchanger with a high capacity for molecules of a molecular or aggregate weight <10,000, was stirred with 0.01 M pyridine acetate buffer of pH 5.0. Of the swollen gel an annular chromatography column was formed of an outer diameter of 6.2 cm., an inner diameter of 1.6 cm. and a height of 15 cm. The column was equilibrated with the said buffer.

The concentrate purified by gel filtration was placed on this column and eluted with 0.01 M pyridine acetate of pH 5.0. By measuring the extinction at 280 mμ the elution of the various fractions was watched (see Diagram 2).

The fraction belonging to the first extinction peak was lyophilized to yield 1.009 gm. of a fat mobilizing substance indicated in Diagram 2 by A, also having a pressor activity. By continued elution with the same buffer a substance was eluted with a second peak which after lyophilization yielded 0.250 gm. of a fat mobilizing substance without pressor activity (B in Diagram 2).

The further elution was performed with 0.05 M acetic acid. The first two fractions (C and D in Diagram 2) with an extinction peak obtained with this eluent had no fat mobilizing activity. The third eluted fraction with an extinction peak at 280 mμ was lyophilised to yield 0.869 gm. of a fat mobilizing substance without pressor activity (E in Diagram 2).

*Example II*

One liter of mother liquor of an acid hog anterior pituitary extract from which the ACTH had been removed by adsorption on carboxymethylcellulose, was adjusted at pH 5.2 with 10 N NaOH. The precipitate formed was removed by centrifugation. To the centrifugate 2 volumes of ethanol were added at 0° C. The precipitate formed was collected and dried in vacuo. The dry precipitate, which weighed 5.63 gm., was dissolved in 50 ml. of pyridine-acetate buffer of pH 5.0.

After centrifugation until clear the solution was subjected in two parts to gel filtration as described in Example I. The collected eluates corresponding with the first extinction peak were evaporated to a volume of 350 ml. By centrifugation a slight turbidity was removed from this solution.

Subsequent chromatography over DEAE Sephadex-A 25, performed as described in Example I, showed a chromatogram corresponding with that of Diagram 2, with the difference that between the first and the second peak a small double peak had appeared.

Obtained after lyophilisation of the fractions 0.875 gm. of fat mobilizing substances with pressor activity and 0.215 gm. and 1.004 gm. without pressor activity.

I claim:

1. In the method for the preparation of injectable pituitary extract fractions having fat mobilizing activity and which are substantially free from pressor activity, and including the steps of extracting pituitary glands in an aqueous medium, separating inactive solid material from the resulting extract by pH adjustment, and precipitating a crude pituitary concentrate containing active fat mobilizing substances by means of ethanol, the improvement which comprises chromatographing said concentrate over a diethylaminoethyl ether derivative or cross-linked dextran gel, and separating the fat mobilizing substances present from substances having pressor activity by fractionated elution with a buffer selected from the group consisting of sodium acetate-acetic acid, ammonium acetate-acetic acid, pyridine-acetic acid, trimethylamine-acetic acid, and triethylamine-acetic acid, and recovering the fractions having fat mobilizing properties with no substantial pressor activity.

2. The method of claim 1 in which the chromatographing step is carried out at a pH not in excess of about 5.

References Cited by the Examiner

UNITED STATES PATENTS 3,002,823  10/1961  Flodin et al. _____ 260—209

OTHER REFERENCES

Sephadex—A Unique Substance for Modern Chromatography (1962) Pharmacia Fine Chemicals, Inc., New York 17, N.Y., pages 5 to 9 of 20 pages.

Porath, J. et al.: Nature 191 (1961) pages 69 to 70.

JULIAN S. LEVITT, *Primary Examiner.*

MARTIN J. COHEN, *Assistant Examiner.*